United States Patent

Matsubara et al.

(10) Patent No.: US 8,720,039 B2
(45) Date of Patent: May 13, 2014

(54) LAMINATED CORE PUNCHING APPARATUS

(75) Inventors: Tetsuya Matsubara, Okazaki (JP);
Shigeru Maeda, Toyota (JP); Atsuya Takagi, Kariya (JP); Takuya Ooura, Oobu (JP); Hajime Nishiguchi, Anjyo (JP); Motoki Koori, Anjyo (JP); Masahiro Hayabuchi, Anjo (JP); Susumu Kato, Anjyo (JP); Keishi Ohki, Ichikawa (JP); Kenji Shinohara, Edogawa-ku (JP); Akio Murakami, Edogawa-ku (JP)

(73) Assignee: Aisin AW Co., Ltd., Anjo (JP)

( * ) Notice: Subject to any disclaimer, the term of this patent is extended or adjusted under 35 U.S.C. 154(b) by 633 days.

(21) Appl. No.: 13/071,971

(22) Filed: Mar. 25, 2011

(65) Prior Publication Data

US 2011/0232076 A1 Sep. 29, 2011

(30) Foreign Application Priority Data

Mar. 26, 2010 (JP) ................. 2010-072477

(51) Int. Cl.
*B23P 21/00* (2006.01)
*H02K 15/02* (2006.01)
*B21D 28/02* (2006.01)
*B21D 28/06* (2006.01)

(52) U.S. Cl.
CPC ............. *B23P 21/004* (2013.01); *H02K 15/02* (2013.01); *B21D 28/06* (2013.01); *B21D 28/02* (2013.01)
USPC ............. 29/564.2; 29/33 L; 29/33 Q; 29/736; 29/737; 29/738; 226/118.2; 226/189; 242/615.1

(58) Field of Classification Search
USPC ...... 29/33 S, 33 Q, 33 L, 564.2, 564.6, 564.1, 29/732, 736, 737, 738, 761; 242/548, 566, 242/615.1; 226/118.2, 189, 118.3; 83/336, 83/436.6, 272; 72/405.01, 428
See application file for complete search history.

(56) References Cited

U.S. PATENT DOCUMENTS 4,524,507 A * 6/1985 Hara et al. .................. 29/564.2
4,561,581 A * 12/1985 Kelly ............................ 226/113

(Continued)

FOREIGN PATENT DOCUMENTS

JP    A 58-108948    6/1983
JP    A-05-318396   12/1993

(Continued)

OTHER PUBLICATIONS

May 10, 2011 International Search Report issued in PCT/JP2011/052322 (with translation).

*Primary Examiner* — Erica E Cadugan
(74) *Attorney, Agent, or Firm* — Oliff, PLC

(57) ABSTRACT

A laminated core punching apparatus, configured such that a stator-punching press machine that has a molding die performing a partial punching gradually approaches the shape of the stator core piece. There is a punching die to punching out the stator core piece from a strip-form steel plate, and two stator lamination stations. A rotor-punching press machine and a stator-punching press machine are constructed to operate synchronously. An intermediate loop portion capable of causing a strip-form steel plate to hang down in a loop is provided in order to adjust a length of the strip-form steel plate between the two press machines, and a loop guide portion that guides a loop locus of the strip-form steel plate from above so that the strip-form steel plate does not invert is disposed above the intermediate loop portion to be capable of ascending and descending.

7 Claims, 11 Drawing Sheets

(56) References Cited

U.S. PATENT DOCUMENTS

| | | | |
|---|---|---|---|
| 4,845,832 A * | 7/1989 | Martin et al. | 29/564.2 |
| 5,636,432 A * | 6/1997 | Usher et al. | 29/596 |
| 5,915,750 A * | 6/1999 | Usher et al. | 29/564.1 |
| 8,393,070 B2 * | 3/2013 | Shirai et al. | 29/593 |

FOREIGN PATENT DOCUMENTS

| | | |
|---|---|---|
| JP | A-09-233741 | 9/1997 |
| JP | A-09-237726 | 9/1997 |
| JP | A-2000-094055 | 4/2000 |
| JP | A 2002-028735 | 1/2002 |

* cited by examiner

F I G . 12
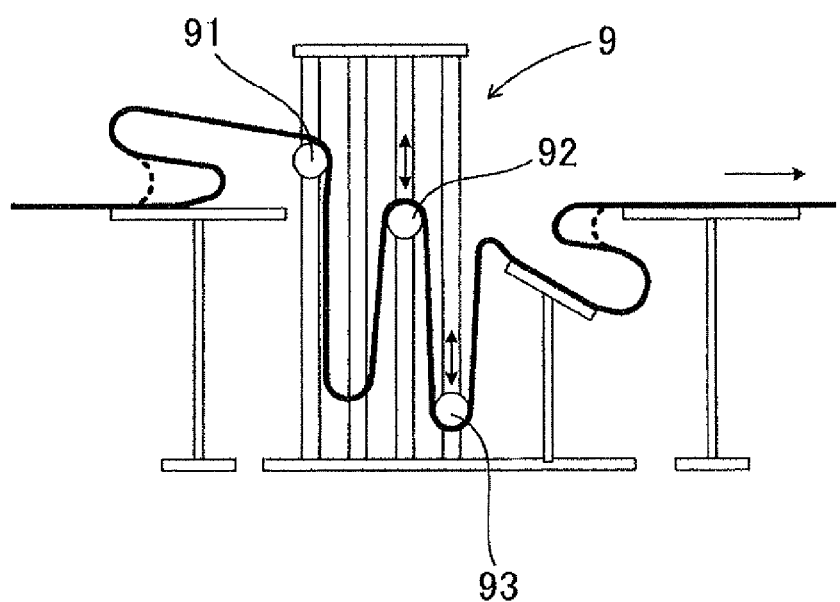

LAMINATED CORE PUNCHING APPARATUS

INCORPORATION BY REFERENCE

The disclosure of Japanese Patent Application No. 2010-072477 filed on Mar. 26, 2010 including the specification, drawings and abstract is incorporated herein by reference in its entirety.

BACKGROUND OF THE INVENTION

The present invention relates to a laminated core punching apparatus for forming a rotor laminated body and a stator laminated body by punching out rotor core pieces and stator core pieces, which serve as a rotor core and a stator core for a rotating electrical machine such as a motor, from a strip-form steel plate and laminating the punched pieces.

DESCRIPTION OF THE RELATED ART

Recent years have seen an increase in demand for comparatively large motors that can be used in hybrid vehicles, electric vehicles, and so on. In a rotating electrical machine such as a motor, a laminated core formed by laminating steel plates is used. The laminated core is typically manufactured by punching a strip-form steel plate serving as a raw material into a disc shape and laminating the punched discs in sequence.

A large apparatus in which a rotor-punching press machine for punching out and laminating rotor core pieces successively while unwinding a strip-form steel plate wound into a coil shape and a stator-punching press machine for punching out and laminating stator core pieces are connected by an accumulator has been used as a conventional laminated core punching apparatus for mass production.

The accumulator is a mechanism for storing a certain length of the strip-form steel plate in order to absorb a deviation between a timing at which the strip-form steel plate advances during a punching operation performed by the rotor-punching press machine, which serves as an upper process, and a timing at which the strip-form steel plate advances during a punching operation performed by the stator-punching press machine, which serves as a lower process.

A deviation between the punching operations of the rotor-punching press machine and the stator-punching press machine is caused by a stoppage timing deviation occurring when the two machines are operating steadily, a punching speed difference, and so on. The rotor-punching press machine and the stator-punching press machine often perform a rotational buildup operation, in which the laminated body is rotated by a predetermined angle in a circumferential direction every time a predetermined number of plates are laminated, in order to reduce the effect of a plate thickness crown in the strip-form steel plate. In this case, the rotor-punching press machine and stator-punching press machine must be stopped. Since it is substantially impossible to make the stoppage timings of the rotor-punching press machine and the stator-punching press machine identical, the aforementioned accumulator is indispensable.

As shown in FIG. 12, for example, an accumulator 9 includes one or a plurality of rollers 91 to 93, and the strip-form steel plate is wound around upper rollers 91, 92 and a lower roller 93 successively. By adjusting a distance between the upper rollers 91, 92 and the lower roller 93, a strip-form steel plate 8 can be accumulated in the accumulator 9 or discharged from the accumulator 9. The provision of this type of accumulator is a factor in the large size of a conventional laminated core punching apparatus.

SUMMARY OF THE INVENTION

In a laminated core punching apparatus including the accumulator described above, the length of the strip-form steel plate that has to be stored during a stoppage increases steadily with increases in the punching speed, and as a result, the size of the accumulator must be increased even further. Moreover, when the speed of the strip-form steel plate passing through the accumulator and at the front and rear thereof is increased, a running condition of the strip-form steel plate is more likely to become unstable. It is therefore desirable to develop a laminated core punching apparatus in which the punching speed can be increased without the use of an accumulator.

To improve the efficiency of a press machine, the number of stopping operations performed by the press machine must be reduced. This can be achieved using various methods, and performing a core lamination process in two stations, as proposed by Japanese Patent Application Publication JP-A-S58-108948, for example, is effective.

However, although the method proposed in Japanese Patent Application Publication JP-A-S58-108948 is effective for improving the efficiency of a single press apparatus, namely the rotor-punching press machine or the stator-punching press machine, the accumulator that is required when two press machines, i.e. the rotor-punching press machine and the stator-punching press machine, are arranged in series cannot simply be eliminated.

The present invention has been designed in consideration of these problems, and it is an object of the present invention to provide a laminated core punching apparatus that can be operated at a high speed without providing an accumulator between a rotor-punching press machine and a stator-punching press machine.

In a laminated core punching apparatus according to a first aspect of the present invention having an uncoiler for unwinding a strip-form steel plate for an iron core that is wound into a coil shape and set thereon, a rotor-punching press machine for punching out a rotor core piece from the strip-form steel plate and laminating the punched rotor core piece, and a stator-punching press machine for punching out a stator core piece from the strip-form steel plate following punching of the rotor core piece and laminating the punched stator core piece, the rotor-punching press machine includes a molding die that performs partial punching gradually to approach a shape of the rotor core piece, a punching die for punching out the rotor core piece from the strip-form steel plate, and two rotor lamination stations for laminating the punched rotor core piece such that when a punching operation is underway in one of the rotor lamination stations, a punching operation in the other rotor lamination station is stopped, and in the rotor lamination station where punching is stopped, a rotational buildup operation for rotating a rotor laminated body obtained by laminating the rotor core piece by a predetermined angle in a circumferential direction can be performed; the stator-punching press machine includes a molding die that performs partial punching gradually to approach the shape of the stator core piece, a punching die for punching out the stator core piece from the strip-form steel plate, and two stator lamination stations for laminating the punched stator core piece such that when the punching operation is underway in one of the stator lamination stations, the punching operation in the other stator lamination station is stopped, and in the stator lamination station where punching is stopped, the rotational buildup operation for rotating the stator laminated body obtained by laminating the stator core piece by a predetermined angle in the circumferential direction can be performed; the rotor-punching press machine and the stator-punching press machine are constructed to perform the punching operation synchronously; and an intermediate loop portion capable of causing the strip-form steel plate to hang down in a loop shape is provided between the rotor-punching press machine and the stator-punching press machine in order to adjust a length of the strip-form steel plate between the two press machines, and a loop guide portion that guides a loop locus of the strip-form steel plate from above so that the strip-form steel plate does not invert is disposed above the intermediate loop portion to be capable of ascending and descending.

In the laminated core punching apparatus according to the present invention, the rotor-punching press machine includes two rotor lamination stations, as described above. Further, when the punching operation is underway in one of the rotor lamination stations, the punching operation in the other rotor lamination station can be stopped, and during this stoppage, the rotational buildup operation described above can be performed. Therefore, as long as the strip-form steel plate continues to be supplied normally, there is no need to stop the rotor-punching press machine individually.

Similarly, the stator-punching press machine includes two stator lamination stations, as described above. Further, when the punching operation is underway in one of the stator lamination stations, the punching operation in the other stator lamination station can be stopped, and during this stoppage, the rotational buildup operation described above can be performed. Therefore, as long as the strip-form steel plate continues to be supplied normally, there is no need to stop the stator-punching press machine individually.

Furthermore, the rotor-punching press machine and the stator-punching press machine are constructed to perform the punching operation synchronously. More specifically, the rotor-punching press machine and the stator-punching press machine either perform punching continuously at a perfectly identical punching speed or are stopped simultaneously.

Therefore, as long as a problem does not occur in the rotor-punching press machine and the stator-punching press machine, the required length of the strip-form steel plate existing between the two press machines disposed in series remains constant until the size of the rotor and stator to be punched is modified. Accordingly, while processing for an identical size is underway, an accumulator is not required.

When the size of the rotor core piece and stator core piece to be punched is changed such that a die set is exchanged, on the other hand, the required length of the strip-form steel plate between the two press machines varies. In this case, the length of the strip-form steel plate between the rotor-punching press machine and the stator-punching press machine can be adjusted in the intermediate loop portion provided between the two press machines.

A further point to be noted is that the loop guide portion is provided above the intermediate loop portion. As described above, the loop guide portion is disposed to be capable of ascending and descending. Therefore, the loop guide portion can be set in an appropriate position even when a loop height varies in accordance with the size of the punched rotor core piece and stator core piece. Further, by providing the loop guide portion, the shape of the loop in the intermediate loop portion can be stabilized, and therefore the loop can be prevented from inverting even when the punching speed of the rotor-punching press machine and the stator-punching press machine, or in other words a line speed, is increased beyond a conventional speed. As a result, an operation can be performed with stability.

The intermediate loop portion is formed such that in a natural condition, the strip-form steel plate hangs down in a loop shape. When a feed speed of the strip-form steel plate is comparatively low, the loop remains in this natural condition without problems. If the feed speed is increased, however, vibration generated in the strip-form steel plate when the strip-form steel plate is started and stopped in accordance with the punching operations of the respective press machines has a large effect, and as a result, the condition of the loop may be disturbed, causing the strip-form steel plate to fold or the like. By setting the loop guide portion in an optimum position for the loop shape formed in the intermediate loop portion such that the strip-form steel plate is guided while being pressed appropriately, the effect of the vibration generated while starting and stopping the strip-form steel plate can be suppressed, and therefore the correct loop shape can be maintained at all times. As a result, the line speed can be increased dramatically in comparison with a conventional line speed.

Hence, in the laminated core punching apparatus according to the present invention, by providing two rotor lamination stations and two stator lamination stations, synchronizing the punching operations of the rotor-punching press machine and the stator-punching press machine, providing the intermediate loop portion, and providing the loop guide portion capable of ascending and descending, a laminated core punching apparatus that is compact and capable of operating at a higher speed than a conventional apparatus without the need for an accumulator can be provided.

BRIEF DESCRIPTION OF THE DRAWINGS

FIG. 12 is an illustrative view showing an example of an accumulator according to the related art.

DETAILED DESCRIPTION OF THE EMBODIMENT

In a laminated core punching apparatus according to the present invention, each of a rotor-punching press machine and a stator-punching press machine is preferably constructed to perform a punching operation in accordance with rotation of a crankshaft. Further, the crankshaft of the rotor-punching press machine and the crankshaft of the stator-punching press machine are preferably connected to each other so as to rotate integrally.

More specifically, the rotor-punching press machine and the stator-punching press machine respectively include a lower die portion and an upper die portion, and the punching operation is performed by raising and lowering one of the die portions. This raising/lowering operation is preferably performed by rotating the crankshaft, as described above, rather than using an actuator, for example, a hydraulic cylinder and the crankshafts of the two press machines are preferably connected mechanically so as to be integrated. In so doing, the punching operations of the rotor-punching press machine and the stator-punching press machine can be perfectly aligned, and as a result, a more stable operation can be realized.

Further, the laminated core punching apparatus described above is particularly effective when an outer diameter of the stator core piece is within a range of 200 mm to 300 mm. More specifically, a feed amount of the strip-form steel plate per stroke must be increased steadily as the outer diameter of a punching subject increases, and as a result, it becomes difficult to achieve increases in speed. In a conventional large laminated core punching apparatus for punching out a large finished product in which the outer diameter of the stator core piece is within a range of 200 mm to 300 mm, it is particularly difficult to increase the operation speed above 220 spm (strokes per minute). However, by applying the laminated core punching apparatus constituted as described above in which a stable, high-speed operation can be realized, an operation can be performed at a speed in excess of 220 spm.

Further, the laminated core punching apparatus described above is particularly effective when the rotor core piece and the stator core piece are automobile pieces used in a motor for driving an automobile. More specifically, since mass production is required for automobiles, it is extremely advantageous to apply the laminated core punching apparatus constituted as described above, in which a stable, high-speed operation can be realized.

(First Embodiment)

A laminated core punching apparatus according to an embodiment of the present invention will now be described using FIGS. 1 to 11.

Figure 1:
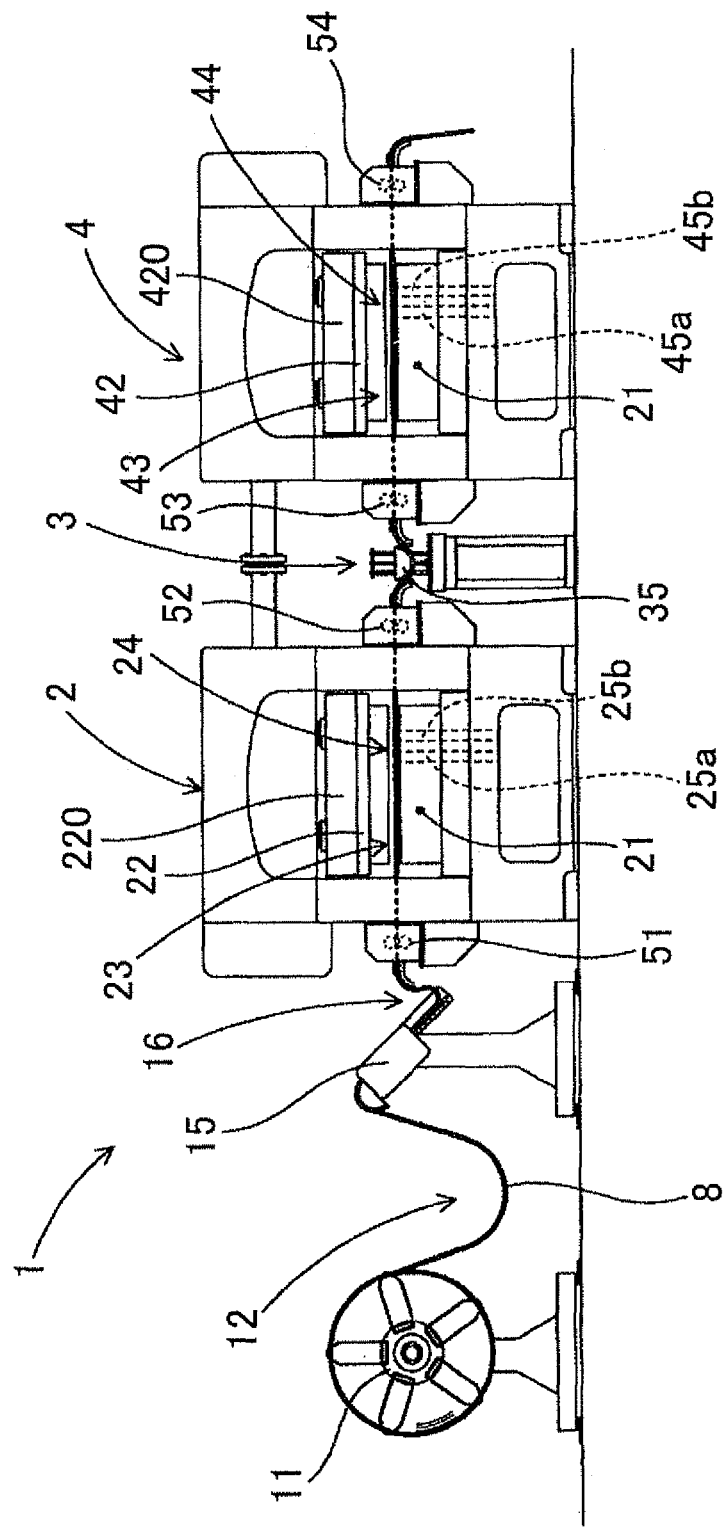
FIG. 1 is an illustrative view showing an overall constitution of a laminated core punching apparatus according to a first embodiment.

As shown in FIG. 1, a laminated core punching apparatus 1 according to this embodiment includes an uncoiler 11 for unwinding a strip-form steel plate 8 for an iron core that is wound into a coil shape and set thereon, a rotor-punching press machine 2 for punching out a rotor core piece 81 (FIG. 3) from the strip-form steel plate 8 and laminating the punched rotor core piece 81, and a stator-punching press machine 4 for punching out a stator core piece 82 (FIG. 4) from the strip-form steel plate 8 following punching of the rotor core piece 81 and laminating the punched stator core piece 82.

The rotor-punching press machine 2 includes a molding die 23 that performs partial punching gradually to approach the shape of the rotor core piece 81, a punching die 24 for punching out the rotor core piece 81 from the strip-form steel plate 8, and two rotor lamination stations 25 for laminating the punched rotor core piece 81. When a punching operation is underway in one of the rotor lamination stations 25a (25b), the punching operation in the other rotor lamination station 25b (25a) is stopped such that in the rotor lamination station 25b (25a) where punching is stopped, a rotational buildup operation for rotating a rotor laminated body 810 of the laminated rotor core pieces 81 by a predetermined angle in a circumferential direction can be performed.

The stator-punching press machine 4 includes a molding die 43 that performs partial punching gradually to approach the shape of the stator core piece 82, a punching die 44 for punching out the stator core piece 82 from the strip-form steel plate 8, and two stator lamination stations 45 for laminating the punched stator core piece 82. When a punching operation is underway in one of the stator lamination stations 45a (45b), the punching operation in the other stator lamination station 45b (45a) is stopped such that in the stator lamination station 45b (45a) where punching is stopped, a rotational buildup operation for rotating a stator laminated body (not shown) of the laminated stator core pieces 82 by a predetermined angle in the circumferential direction can be performed.

Further, the rotor-punching press machine 2 and the stator-punching press machine 4 are constructed to perform the punching operation synchronously.

An intermediate loop portion 3 capable of causing the strip-form steel plate 8 to hang down in a loop shape is provided between the rotor-punching press machine 2 and the stator-punching press machine 4 in order to adjust a length of the strip-form steel plate 8 between the two press machines. A loop guide portion 35 that guides a loop locus of the strip-form steel plate 8 from above such that the strip-form steel plate 8 does not invert is disposed above the intermediate loop portion 3 to be capable of ascending and descending.

This will now be described in further detail.

As shown in FIG. 1, the laminated core punching apparatus 1 according to this embodiment includes a roller leveler 15 provided between the uncoiler 11 and the rotor-punching press machine 2. The roller leveler 15 levels the strip-form steel plate 8 such that a flatness thereof is increased by passing the strip-form steel plate between a plurality of leveling rollers disposed in zigzag form. The laminated core punching apparatus 1 according to this embodiment is constructed by arranging in series the uncoiler 11, the roller leveler 15, the rotor-punching press machine 2, the intermediate loop portion 3, and the stator-punching press machine 4.

An entrance side loop portion 12 is provided between the uncoiler 11 and the roller leveler 15. The entrance side loop portion 12 is provided to absorb a difference between a speed of the strip-form steel plate 8 unwound by the uncoiler 11 and a speed of the strip-form steel plate 8 passed through the subsequent roller leveler 15. A position of a lowermost point of the strip-form steel plate 8 in the entrance side loop portion 12 is detected by a sensor, not shown in the drawing, and a rotation speed of the uncoiler 11 is controlled such that the lowermost point is always within a fixed range.

To prevent a defect from occurring in the shape of the strip-form steel plate 8, the roller leveler 15 is controlled not to stop during an operation. Hence, the strip-form steel plate 8 is issued from the roller leveler 15 constantly. Meanwhile, advancement of the strip-form steel plate 8 is invariably halted by the rotor-punching press machine 2 positioned in front of the roller leveler 15 during punching. Therefore, a front loop portion 16 is provided between the roller leveler 15 and the rotor-punching press machine 2 to absorb a difference in a feed speed of the strip-form steel plate 8 between the front and rear thereof.

Figure 2:
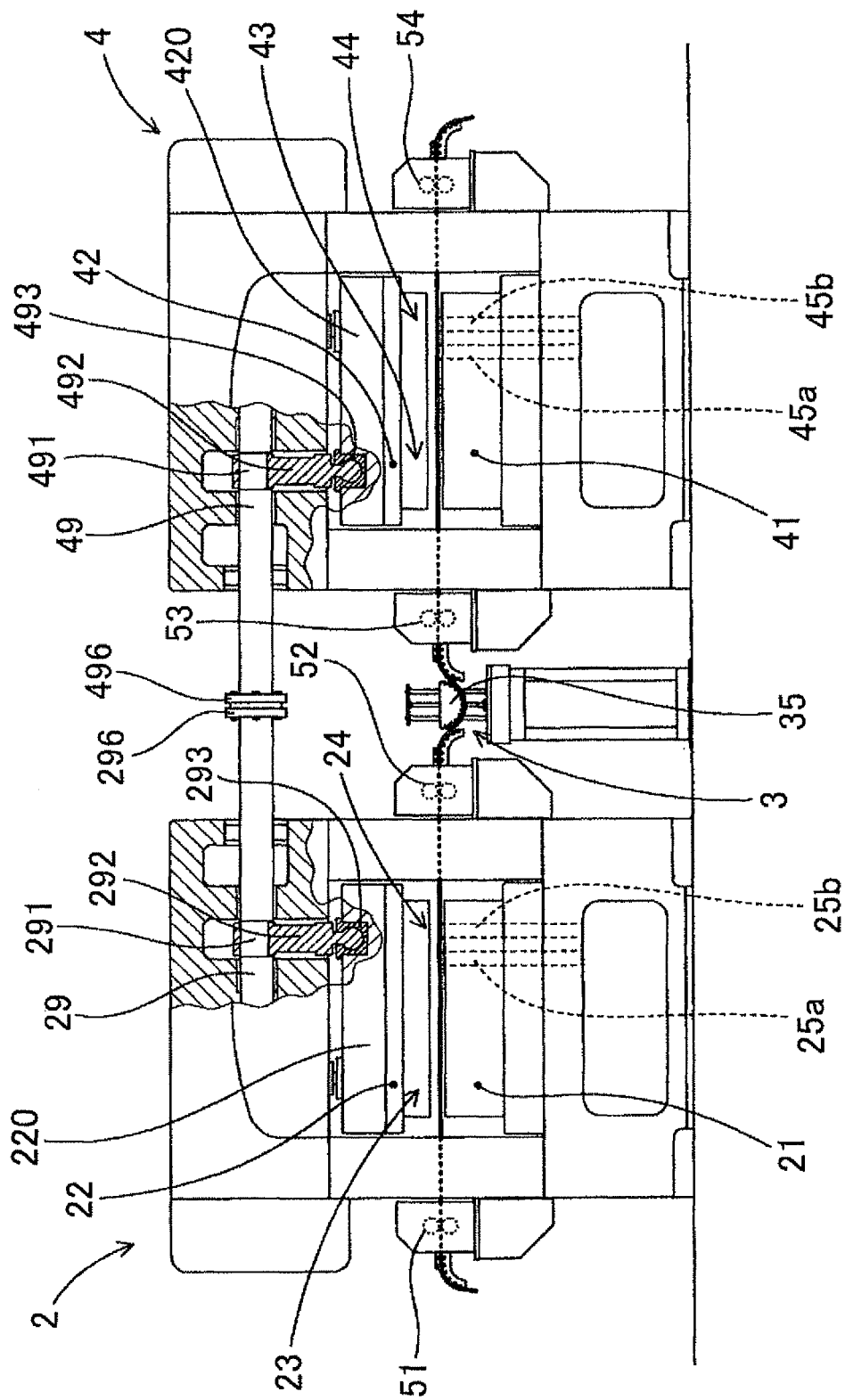
FIG. 2 is an illustrative view showing a connection condition between a rotor-punching press machine and stator-punching-press machine and an intermediate loop portion therebetween, according to the first embodiment.

As shown in FIGS. 1 and 2, a first feeder 51 and a second feeder 52 for controlling a feed amount of the strip-form steel plate 8 are disposed on the entrance side and an exit side of the rotor-punching press machine 2. The first feeder 51 and the second feeder 52 are both constituted by an upper-lower pair of rollers and controlled by a servo.

Further, the rotor-punching press machine 2 includes the molding die 23 and the punching die 24, which form an upper-lower pair incorporated into a lower die set 21 and an upper die set 22. As shown in FIG. 2, the upper die set 22 is attached to a press slide 220, and the press slide 220 is connected to a connecting rod 292, which is connected to an eccentric shaft 291 of a crankshaft 29, via a joint portion 293 so as to move up and down in accordance with rotation of the crankshaft 29. Furthermore, the crankshaft 29 of the rotor-punching press machine 2 is mechanically connected to a crankshaft 49 of the stator-punching press machine 4, to be described below, by bolting together flange portions 296, 496 provided on respective end portions of the two crankshafts.

Figure 5:
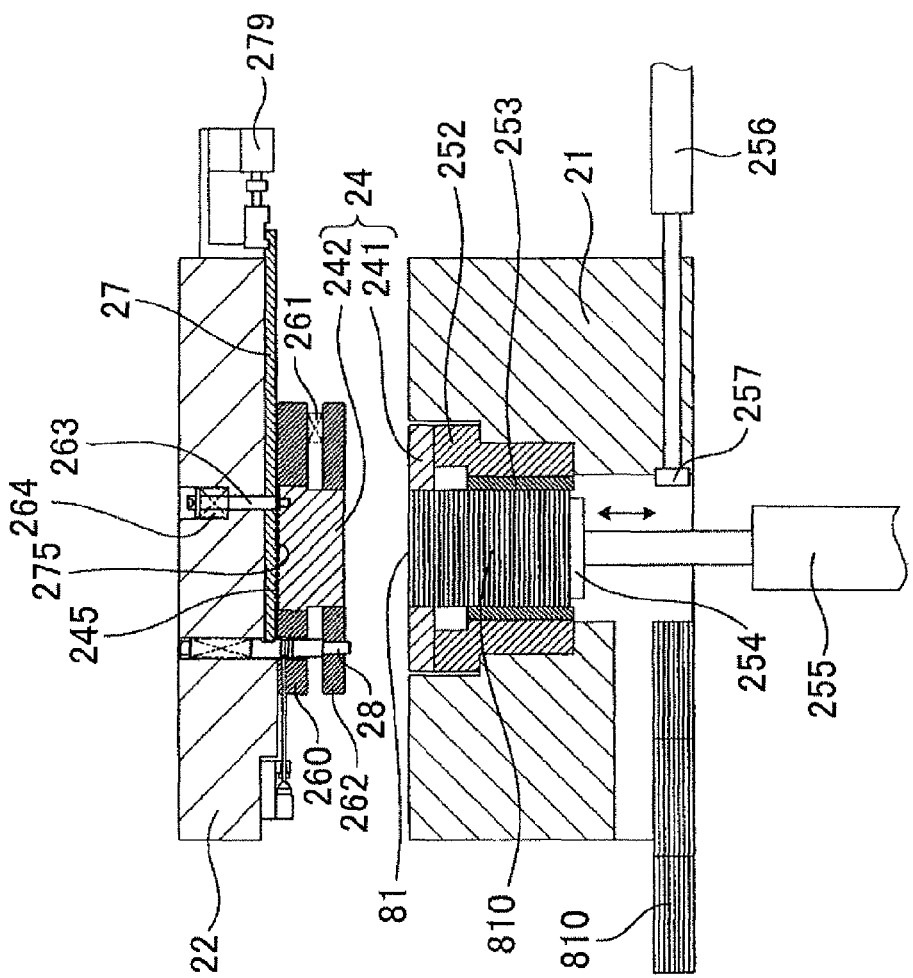
FIG. 5 is an illustrative view showing a condition in which a rotor laminated body (a stator laminated body) is laminated at a rotor lamination station (a stator lamination station), according to the first embodiment.

A plurality of the molding die 23 is arranged in series, and each molding die 23 is constituted by a die and a punch (not shown). The die is set in the lower die set 21, and the punch is set in the upper die set 22. Two punching dies 24 are arranged in series, and as shown in FIG. 5, to be described below, each punching die 24 is constituted by a rotating die 241 set in the lower die set 21 and a punching punch 242 set in the upper die set 22.

Figure 3:
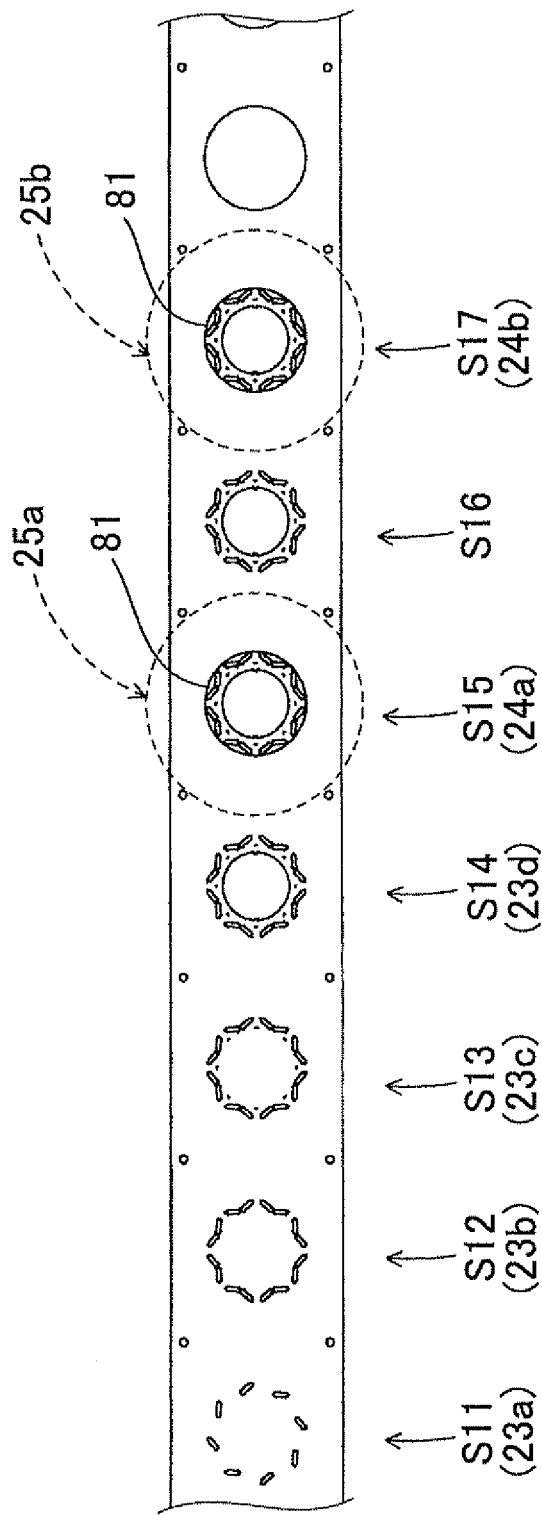
FIG. 3 is an illustrative view showing a rotor punching process according to the first embodiment.

As shown in FIG. 3, a plurality of molding dies 23a to 23d and a plurality of punching dies 24a, 24b are arranged in the following manner in accordance with punching steps S11 to S17 performed on the strip-form steel plate 8. As shown in the drawing, first, a first molding die 23a (not shown) for performing a first molding step S11 shown in the drawing is disposed on a side closest to the entrance of the rotor-punching press machine 2. Next, a second molding die 23b for performing a second molding step S12, a third molding die 23c for performing a third molding step S13, and a fourth molding die 23d for performing a fourth molding step S14 are disposed in sequence.

Next, as shown in the drawing, a first punching die 24a for performing a first punching step S15 is disposed. Then, following an idle step S16 in which punching is not performed, a second punching die 24b for performing a second punching step S17 is disposed. As will be described below, the punching dies 24a, 24b can be switched appropriately between a punching condition and an idle punching condition.

Further, as shown in FIGS. 1 and 2, two rotor lamination stations 25a, 25b are provided below the lower die set 21 of the rotor-punching press machine 2 in alignment with the positions of the punching dies 24a, 24b.

Figure 6:
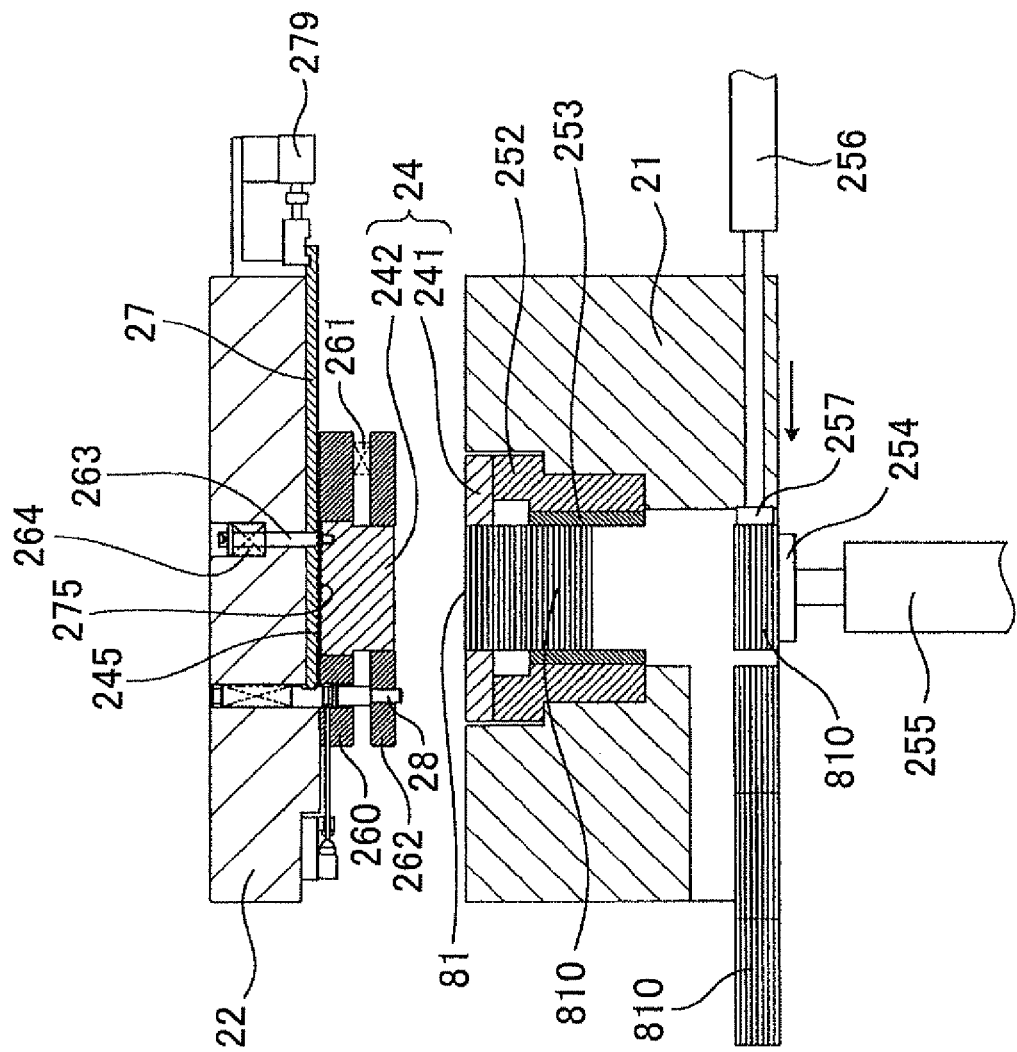
FIG. 6 is an illustrative view showing a condition in which the rotor laminated body (the stator laminated body) is discharged from the rotor lamination station (the stator lamination station), according to the first embodiment.

As shown in FIGS. 5 and 6, the rotor lamination station 25 includes the rotating die 241 serving as the die of the punching die 24 incorporated into the lower die set 21. A rotating holder 252 that supports the rotating die 241 from below and a tubular squeeze ring 253 disposed on an inner peripheral side of the rotating holder 252 are provided below the rotating die 241. The squeeze ring 253 has a slightly different inner diameter in an upper half portion and a lower half portion. The upper half portion is adjusted to an inner diameter dimension that can hold an outer peripheral portion of a rotor laminated body 810 formed by laminating the punched rotor core pieces 81 with an appropriate holding force. The lower half portion, on the other hand, is adjusted to a larger inner diameter dimension than the upper half portion such that the lower half portion does not apply a sufficient holding force for holding the rotor laminated body 810 to the outer peripheral portion thereof.

A back pressure pad 254 for supporting the punched rotor laminated body 810 from below is provided below the rotating die 241. The back pressure pad 254 is raised and lowered by a back pressure cylinder 255 provided therebelow and is therefore capable of applying an appropriate pressure to the rotor laminated body 810 from below.

Further, as shown in FIG. 6, by lowering the back pressure pad 254 after a rotor laminated body 810 corresponding to a single finished product has moved to the lower half portion of the squeeze ring 253, the rotor laminated body 810 corresponding to a single finished product can be lowered so as to separate from a rotor laminated body 810 thereabove. A finished product transportation cylinder 256 is disposed to the side of this lowering position, and by using the finished product transportation cylinder 256 to advance a pusher 257 on a tip end thereof, the rotor laminated body 810 on the back pressure pad 254 can be discharged to the side of the rotor-punching press machine 2.

The rotating die 241, the rotating holder 252, and the squeeze ring 253 can be rotated in the circumferential direction by a rotational buildup driving mechanism, not shown in the drawing. In this embodiment, the rotating die 241, rotating holder 252, and squeeze ring 253 rotate 180° per rotation. Further, when the rotor laminated body 810 carried on the back pressure pad 254 rotates in the circumferential direction, the back pressure pad 254 co-rotates therewith.

As shown in FIGS. 5 and 6, a ring-shaped punch plate 260 and a ring-shaped stripper plate 262 connected to the ring-shaped punch plate 260 via a spring 261 are fixed to the upper die set 22 above the rotor lamination station 25, and the punching punch 242 for punching out the rotor core piece 81 is disposed on an inner side thereof. The punching punch 242 is connected to the upper die set 22 via a punch fixing pin 263 so as to sandwich a cam plate 27. The punch fixing pin 263 is biased upward by the spring 264, and the punching punch 242 is pressed against the cam plate 27 by a biasing force of the spring 264.

Figure 7:
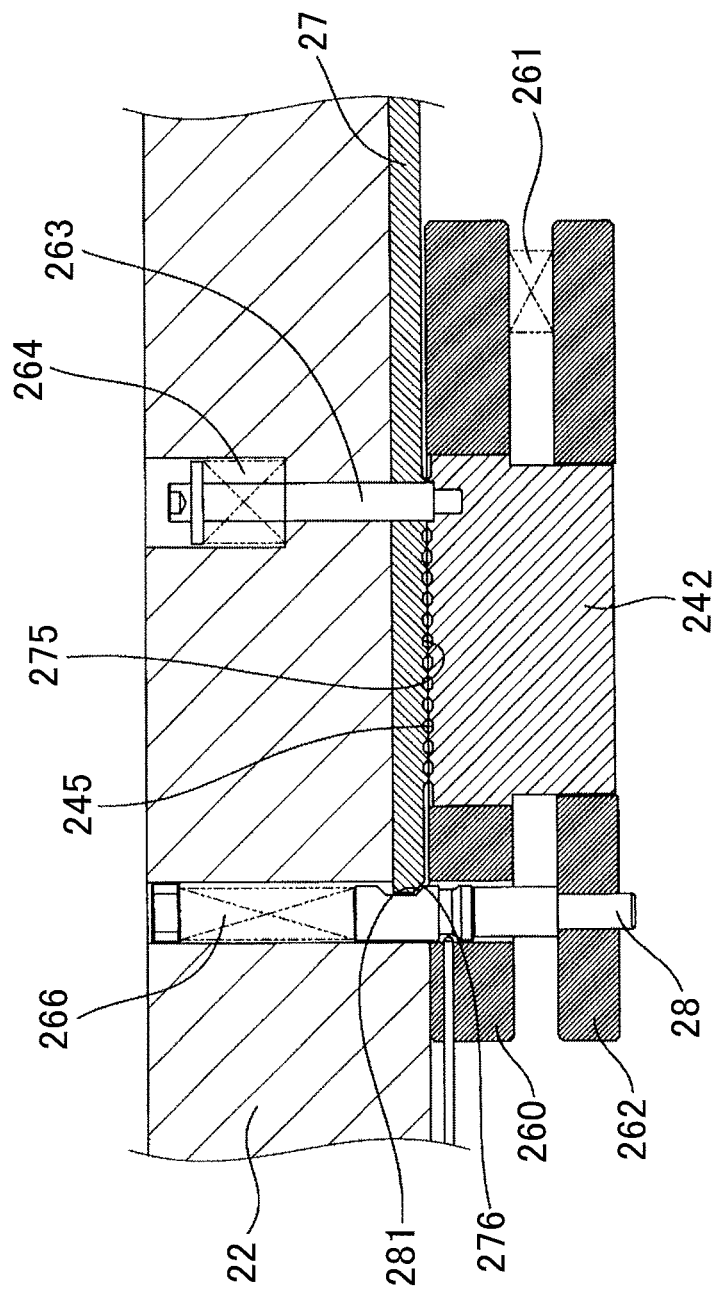
FIG. 7 is an illustrative view showing a constitution of a punching die in a punching condition, according to the first embodiment.

Indented cam surfaces 275, 245 that fit into each other are provided respectively on opposing surfaces of the cam plate 27 and the punching punch 242. Further, an outer shape punch cylinder 279 is engaged to the cam plate 27 to cause the cam plate 27 to advance and withdraw. In an initial state, as shown in FIG. 7, the outer shape punch cylinder 279 (FIG. 5) is in a forward advancement position such that projecting portions of the indented cam surface 275 of the cam plate 27 contact projecting portions of the indented cam surface 245 of the punching punch 242. When the outer shape punch cylinder 279 (FIG. 5) is caused to withdraw, as shown in FIG. 8, the projecting portions of the indented cam surface 275 of the cam plate 27 are fitted into recessed portions of the indented cam surface 245 of the punching punch 242, and as a result, the punching punch 242 withdraws (ascends) by an amount corresponding to a difference of elevation.

When the upper die set 22 is lowered while the punching punch 242 is in an advanced condition, as shown in FIGS. 5 to 7, the punching punch 242 advances into the interior of the rotating die 241, and in this condition, punching can be performed. When the upper die set 22 is lowered while the punching punch 242 is in a withdrawn condition, as shown in FIG. 8, on the other hand, the punching punch 242 does not reach the rotating die 241, and therefore the idle punching condition in which punching cannot be performed is established.

Further, as shown in FIGS. 5 to 8, a die rotation abnormality detection pin 28 that penetrates the punch plate 260 and the stripper plate 262 is provided in the upper die set 22 so as to be biased downward by a spring 266. When the die rotation abnormality detection pin 28 is lowered together with the upper die set 22 and the rotating die 241 therebelow is set in a predetermined circumferential direction position, the die rotation abnormality detection pin 28 enters a position detection hole (not shown) provided in the rotating die 241. When the circumferential direction position of the rotating die 241 deviates from the predetermined position, on the other hand, the die rotation abnormality detection pin 28 impinges on an upper surface of the rotating die 241 and withdraws against the spring 266.

Figure 8:
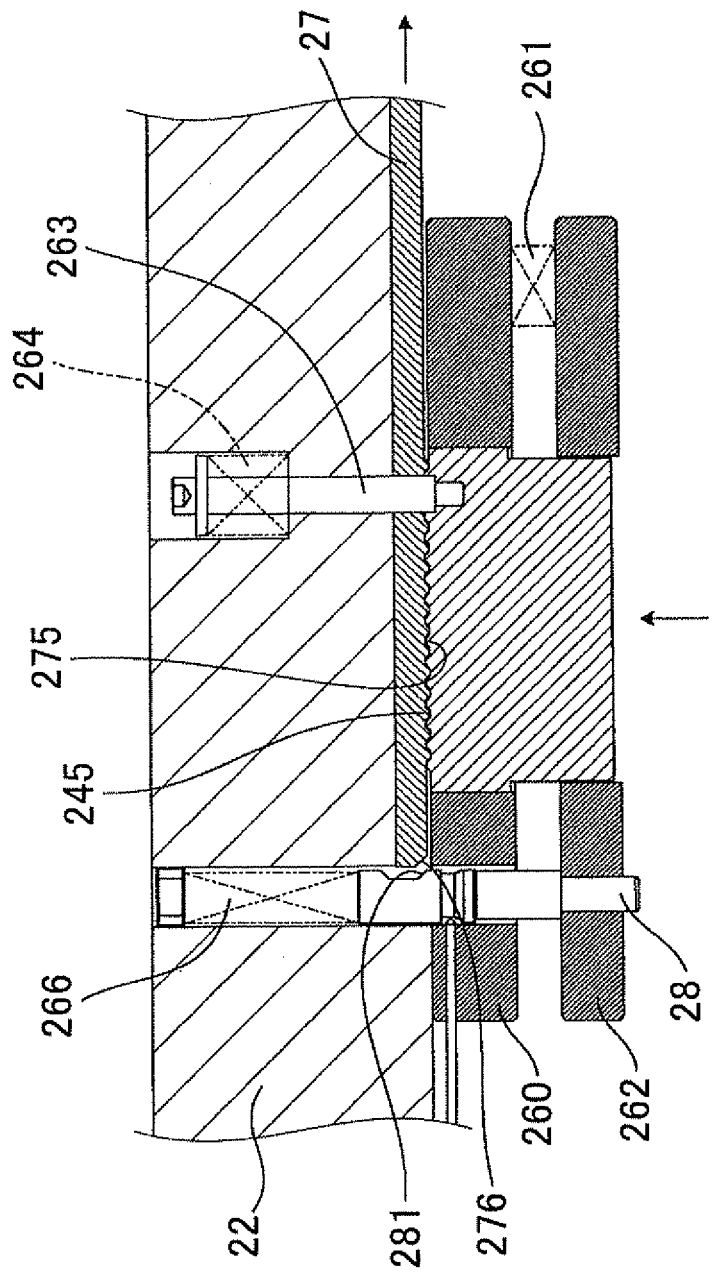
FIG. 8 is an illustrative view showing a constitution of the punching die in an idle punching condition, according to the first embodiment.

As shown in FIGS. 7 and 8, a groove having a tapered surface 281 is provided in an outer peripheral surface of the die rotation abnormality detection pin 28. Further, a tapered surface 276 that opposes the tapered surface 281 is provided on a tip end of the cam plate 27. As shown in FIG. 7, the tapered surface 276 and the tapered surface 281 come into contact when the cam plate 27 and the punching punch 242 are both in forward advancement positions. Hence, when the circumferential direction position of the rotating die 241 deviates from the predetermined position and the upper die set 22 is lowered, the die rotation abnormality detection pin 28 withdraws, causing the tapered surfaces 276 and 281 to slide against each other such that the cam plate 27 and the punching punch 242 withdraw. As a result, the idle punching condition is established, thereby avoiding problems.

As shown in FIGS. 1 and 2, likewise in the stator-punching press machine 4, a third feeder 53 and a fourth feeder 54 for controlling the feed amount of the strip-form steel plate 8 are disposed on the entrance side and the exit side. The third feeder 53 and the fourth feeder 54 are both constituted by an upper-lower pair of rollers and controlled by a servo.

Further, the stator-punching press machine 4 includes a molding die 43 and a punching die 44, which form an upper-lower pair incorporated into a lower die set 41 and an upper die set 42. As shown in FIG. 2, the upper die set 42 is attached to a press slide 420, and the press slide 420 is connected to a connecting rod 492, which is connected to an eccentric shaft 491 of a crankshaft 49, via a joint portion 493 so as to move up and down in accordance with rotation of the crankshaft 49. Furthermore, the crankshaft 29 of the stator-punching press machine 4 and the aforementioned crankshaft 29 of the rotor-punching press machine 2 are mechanically integrated by bolting together the flange portions 496, 296 provided on respective end portions thereof.

Similarly to the rotor-punching press machine 2, a plurality of the molding die 43 of the stator-punching press machine 4 is arranged in series, and each molding die 43 is constituted by a die and a punch (not shown). The die is set in the lower die set 41, and the punch is set in the upper die set 42. Two punching dies 44 are arranged in series, and each punching die 44 is constituted by a rotating die set in the lower die set 41 and a punching punch set in the upper die set 42 (not shown).

Figure 4:
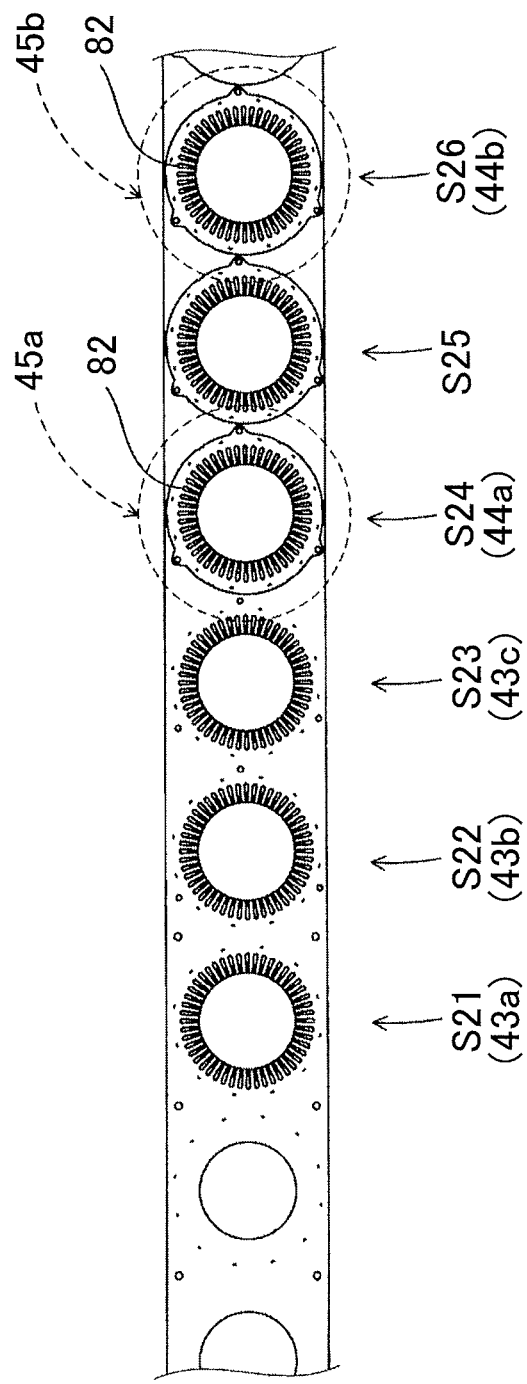
FIG. 4 is an illustrative view showing a stator punching process according to the first embodiment.

As shown in FIG. 4, a plurality of molding dies 43a to 43c and a plurality of punching dies 44a, 44b are arranged in the following manner in accordance with punching steps S21 to S26 performed on the strip-form steel plate 8. As shown in the drawing, first, a first molding die 43a (not shown) for performing a first molding step S21 shown in the drawing is disposed on a side closest to the entrance of the stator-punching press machine 4. Next, as shown in the drawing, a second molding die 43b for performing a second molding step S22 and a third molding die 43c for performing a third molding step S23 are disposed in sequence.

Next, as shown in the drawing, a first punching die 44a for performing a first punching step S24 is disposed. Then, following an idle step S25 in which punching is not performed, a second punching die 44b for performing a second punching step S26 is disposed. The punching dies 44a, 44b are disposed such that only one thereof is active at all times.

Apart from differences in an outer diameter dimension and so on, the punching dies 44 (not shown) of the stator-punching press machine 4 and the stator lamination station 45 provided therebelow are constituted substantially identically to the punching dies 24 and the rotor lamination stations 25 of the rotor-punching press machine 2, and therefore detailed description of these components has been omitted. Note that a circumferential direction rotation angle of the stator lamination station 45 is 120° per rotation.

Figure 9:
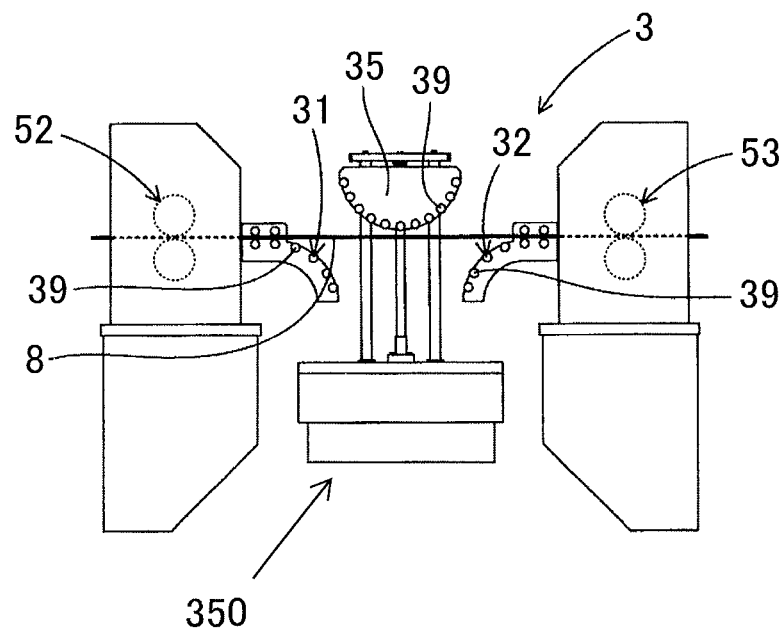
FIG. 9 is an illustrative view showing a condition in which a loop guide portion of the intermediate loop portion has been raised to an upper limit, according to the first embodiment.
Figure 10:
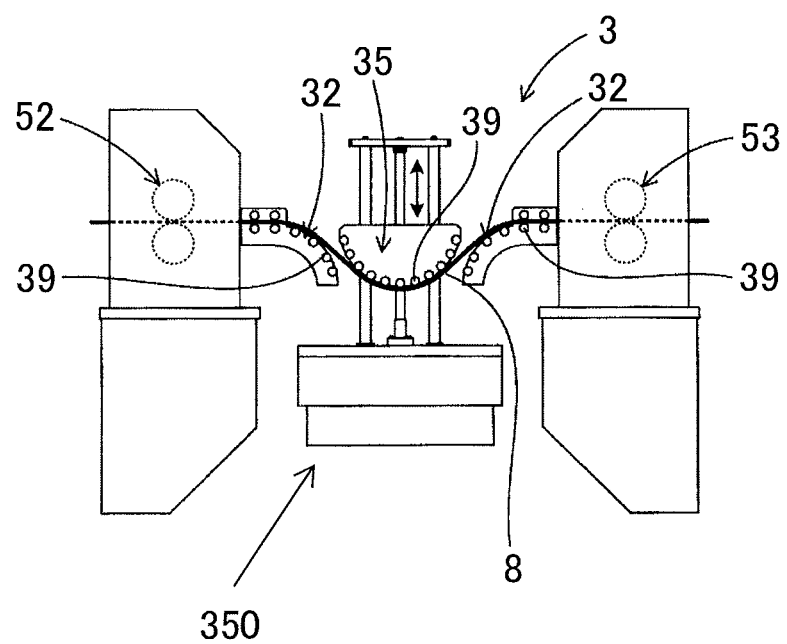
FIG. 10 is an illustrative view showing a condition in which the loop guide portion of the intermediate loop portion has been lowered to a usage condition, according to the first embodiment.

As shown in FIGS. 1 and 2, the intermediate loop portion 3 is provided between the rotor-punching press machine 2 and the stator-punching press machine 4. As shown in FIGS. 9 and 10, the intermediate loop portion 3 is formed from a curved-surface cradle 31 provided on an exit side of the second feeder 52 on the exit side of the rotor-punching press machine 2, a curved-surface cradle 32 provided on an entrance side of the third feeder 53 on the entrance side of the stator-punching press machine 4, and a space between the cradles 31, 32. The cradle 31 has an arc-shaped curved surface that is oriented steadily further downward from a horizontal condition as a distance from the second feeder 52 increases, and a curvature radius thereof is set within an elastic deformation range of the strip-form steel plate 8. The cradle 32 has an arc-shaped curved surface that is oriented steadily further downward from a horizontal condition as a distance from the third feeder 53 increases, and a curvature radius thereof is identical to that of the cradle 31. A plurality of free rollers 39 capable of rotating freely are disposed on the cradle 31 and the cradle 32 so as to follow the shape thereof.

The loop guide portion 35 is provided above the space between the cradle 31 and the cradle 32 of the intermediate loop portion 3. A lower surface of the loop guide portion 35 takes an arc-shaped curved surface shape, and a plurality of free rollers 39 capable of rotating freely are provided to follow the shape thereof. A curvature radius of the arc-shaped curved surface is likewise set within the elastic deformation range of the strip-form steel plate 8. The loop guide portion 35 is attached to an elevator apparatus 350 and is therefore capable of ascending and descending in a vertical direction. As shown in FIG. 9, a raised end of the loop guide portion 35 is set to be slightly higher than a position of a straight line linking the second feeder 52 and the third feeder 53. A lowered end of the loop guide portion 35 is positioned to contact the cradle 31 and the cradle 32 (not shown).

Next, a flow of a process for manufacturing a laminated core using the laminated core punching apparatus 1 having the above constitution will be described.

As shown in FIG. 1, the strip-foul) steel plate 8 set on the uncoiler 11 advances through the roller leveler 15, the rotor-punching press machine 2, the intermediate loop portion 3, and the stator-punching press machine 4 in that order, whereby finally, a bone-form scrap material known as a skeleton, which is obtained after the rotor core piece 81 and the stator core piece 82 have been punched, is discharged from the exit side of the stator-punching press machine 4.

Overall control of the laminated core punching apparatus 1 is performed by a control apparatus, not shown in the drawings, and a punching speed (spm: number of punches per minute) of the rotor-punching press machine 2 and stator-punching press machine 4 serves as an index of the overall speed of the apparatus. With this embodiment, the manufacturing speed of a large laminated core in which an outer diameter of the stator core piece 82 is approximately 250 mm can be raised from a previous upper limit of 220 spm to 400 spm.

Furthermore, in this embodiment, as shown in FIG. 10, the loop guide portion 35 of the intermediate loop portion 3 is set below the position of the straight line linking the second feeder 52 and the third feeder 53 so as to guide the strip-form steel plate 8 into a desired loop shape from above.

Figure 11:
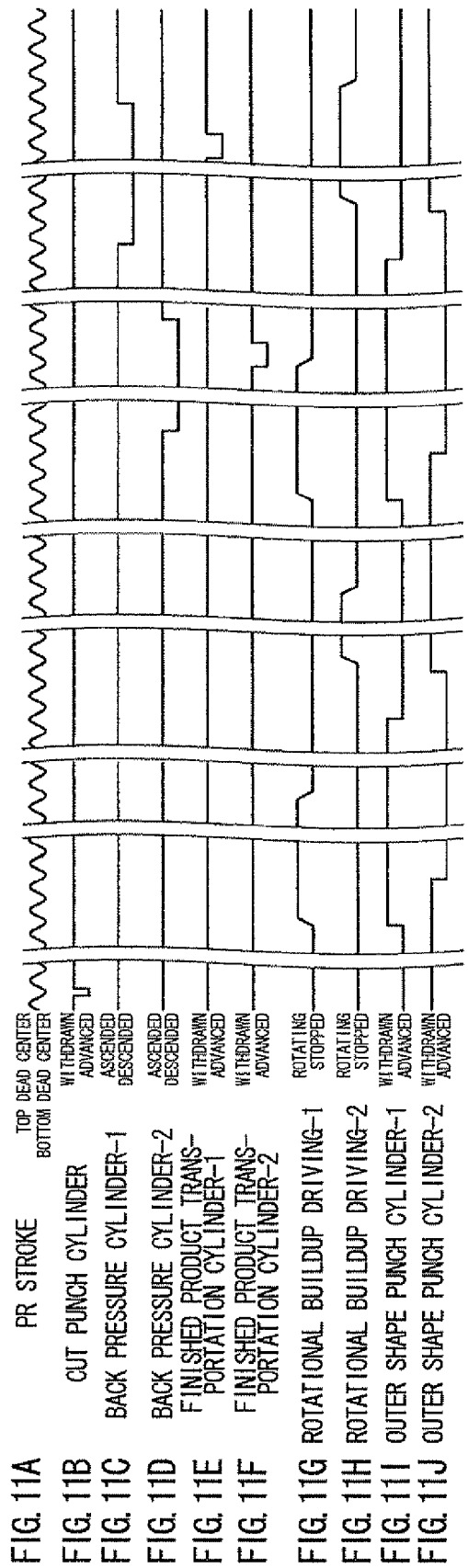
FIG. 11 is a time chart showing movement of the rotor-punching press machine, according to the first embodiment.

Operations of each part of the laminated core punching apparatus 1 will now be described using a timing chart shown in FIG. 11, centering on the rotor-punching press machine 2. In FIG. 11, time is shown on the abscissa and items relating the respective parts of the rotor-punching press machine 2 are shown on the ordinate. The condition of each item in two locations, i.e. an upper position and a lower position, is indicated by variation in a solid line.

In the drawing, (a) indicates a rotary movement of the crankshaft 29 of the rotor-punching press machine 2 between so-called top dead center and bottom dead center. At a time corresponding to bottom dead center, a condition in which the upper die set 22 has descended to a lowest point such that punching is performed by the respective dies is established.

Although description thereof has been omitted, (b) in the drawing corresponds to a timing at which a cut punch cylinder (not shown) for separating the rotor laminated body 810 held by the squeeze ring 253 from the rotor laminated body 810 thereabove is initially caused to advance.

(c) in the drawing shows an elevator operation of the back pressure cylinder 255 in the first rotor lamination station 25a of the rotor-punching press machine 2. (d) in the drawing shows an elevator operation of the back pressure cylinder 255 in the second rotor lamination station 25b of the rotor-punching press machine 2.

(e) in the drawing shows an advance/withdrawal operation of the finished product transportation cylinder 256 in the first rotor lamination station 25a of the rotor-punching press machine 2. (f) in the drawing shows an advance/withdrawal operation of the finished product transportation cylinder 256 in the second rotor lamination station 25b of the rotor-punching press machine 2.

(g) in the drawing shows a rotation/stoppage condition of the rotational buildup driving mechanism for rotating by 180° the rotating die 241 and so on in the first rotor lamination station 25a of the rotor-punching press machine 2. (h) in the drawing shows a rotation/stoppage condition of the rotational buildup driving mechanism for rotating by 180° the rotating die 241 and so on in the second rotor lamination station 25b of the rotor-punching press machine 2.

(i) in the drawing shows an advance/withdrawal operation of the outer shape punch cylinder 279 in a position opposing the first rotor lamination station 25a of the rotor-punching press machine 2. (j) in the drawing shows an advance/withdrawal operation of the outer shape punch cylinder 279 in a position opposing the second rotor lamination station 25b of the rotor-punching press machine 2.

As shown in (a) to (j) of the drawing, when the laminated core punching apparatus 1 operates steadily, the upper die set 22 ascends and descends regularly in accordance with rotation of the crankshaft 29 such that a punching operation is performed, and each part operates in accordance with the progression of the punching operation. In an initial stage at the start of the punching operation, as shown in (h) of the drawing, the cut punch cylinder (not shown) advances by an amount corresponding to a single cycle in order to perform an operation for separating the rotor laminated bodies 810. Note that of the two rotor lamination stations 25, the first rotor lamination station 25a is activated to perform punching and lamination first.

Next, as shown in (i) of the drawing, the outer shape punch cylinder 279 corresponding to the first rotor lamination station 25a is caused to withdraw to a position where the punching punch 242 performs idle punching. At the same time, as shown in (g) of the drawing, the rotational buildup driving mechanism in the first rotor lamination station 25a is driven to rotate by 180° a rotational buildup operation for rotating the rotating die 241, the rotor laminated body 810, and so on is performed. Meanwhile, punching in the first rotor lamination station 25a is stopped.

The idle punching condition is established likewise in the second rotor lamination station 25b for two strokes following the withdrawal of the outer shape punch cylinder 279 corresponding to the first rotor lamination station 25a, but prior to entering a third stroke, as shown in (j) of the drawing, the outer shape punch cylinder 279 corresponding to the second rotor lamination station 25b is advanced such that the punching punch 242 advances to a position in which punching is possible. Hence, punching begins in the second rotor lamination station 25b precisely at the third stroke after the punching performed in the first rotor lamination station 25a has shifted to idle punching. As shown in FIG. 3, this corresponds to the fact that the second rotor lamination station 25b for performing the second punching step S17 is disposed to the rear of the first rotor lamination station 25a for performing the first punching step S15 via the idle step S16.

Next, as shown in (g) of the drawing, the rotational buildup operation in the first rotor lamination station 25a ends, whereby the rotational buildup driving mechanism for rotating the rotating die 241, the rotor laminated body 810, and so on stops rotating. The first rotor lamination station 25a remains in the idle punching condition thereafter until a rotation buildup timing arrives in the second rotor lamination station 25b.

Next, as shown in (i) of the drawing, the outer shape punch cylinder 279 corresponding to the first rotor lamination station 25a is advanced such that the punching punch 242 advances to a position in which punching is possible. As a result, punching in the first rotor lamination station 25a resumes, and for the next two strokes, punching is performed simultaneously in the first and second rotor lamination stations 25a, 25b.

As shown in (j) of the drawing, the outer shape punch cylinder 279 corresponding to the second rotor lamination station 25b is caused to withdraw precisely at the third stroke after punching resumes in the first rotor lamination station 25a, whereby the punching punch 242 withdraws to a position in which idle punching is performed. At the same time, as shown in (h) of the drawing, the rotational buildup driving mechanism of the second rotor lamination station 25b is driven to rotate such that a rotational buildup for rotating by 180° the rotating die 241, the rotor laminated body 810, and so on is performed. Meanwhile, punching in the second rotor lamination station 25b is stopped.

Hence, in the rotor-punching press machine 2, the rotational buildup operation is performed alternately in the first and second rotor lamination stations 25a, 25b while rotating the crankshaft 29 continuously such that a basic punching operation is not stopped.

The rotor laminated body 810 is then discharged every time a predetermined amount of the rotor laminated bodies 810 are stacked on the back pressure pad 254.

In this embodiment, as shown in (d) of the drawing, the back pressure pad 254 in the second rotor lamination station 25b is lowered by the back pressure cylinder 255 after a predetermined amount of the rotor laminated bodies 810 corresponding to at least one finished product have been stacked on the raised back pressure pad 254. Hence, in the second rotor lamination station 25b, rotor laminated bodies 810 corresponding to a single finished product are lowered separately from the laminated bodies 810 thereabove.

Next, as shown in (f) of the drawing, the rotor laminated bodies 810 on the back pressure pad 254 are discharged toward the side of the rotor-punching press machine 2 by causing the finished product transportation cylinder 256 of the second rotor lamination station 25b to advance. During this series of discharging operations, there is no need to halt the punching operation, and therefore the discharging operations can be performed as needed.

As described above, in the rotor-punching press machine 2, punching, idle punching, and rotational buildup can be performed in the first and second rotor lamination stations 25a, 25b, and finished product discharge can be performed as needed, while rotating the crankshaft 29 continuously such that a basic punching operation is not stopped.

This applies likewise to the stator-punching press machine 4, in which the basic punching operation is performed by rotating the crankshaft 49 in synchronization with the rotor lamination station 2. Note that in the stator-punching press machine 4, since the rotation angle of the rotational buildup operation is 120° and the number of laminated bodies corresponding to a single finished product differs from that of the rotor-punching press machine 2, the timings of the respective operations do not match those of the rotor-punching press machine 2. However, the punching timing is perfectly synchronized, and therefore the speed at which the strip-form steel plate 8 advances is identical in the two press machines.

Since the advancement speed of the strip-form steel plate 8 is identical in the rotor-punching press machine 2 and the stator-punching press machine 4, the length of the strip-form steel plate 8 in the intermediate loop portion 3 between the two press machines is identical at all times. Accordingly, a loop length in the intermediate loop portion 3 is constant.

Meanwhile, when an operation is performed at the extremely high speed of 400 spm, as described above, the loop in the intermediate loop portion 3 is started and stopped 400 times per minute. Therefore, if the loop is left in a natural condition, there may be a problem that the strip-form steel plate 8 is folded back by the shape of the loop being disturbed or the loop being inverted by vibration generated due to the starting and stopping.

In this embodiment, however, as described above, the loop guide portion 35 of the intermediate loop portion 3 is lowered to an appropriate position in order to guide the loop so that the loop does not invert.

As a result, a stable operating condition can be realized even when the operation is performed at the extremely high speed of 400 spm.

Hence, in the laminated core punching apparatus 1 according to this embodiment, by providing two rotor lamination stations 25 and two stator lamination stations 45, synchronizing the punching operations of the rotor-punching press machine 2 and the stator-punching press machine 4, providing the intermediate loop portion 3, and providing the loop guide portion 35 capable of ascending and descending, an apparatus that is compact and capable of operating at a higher speed than a conventional apparatus without the need for an accumulator can be provided.

What is claimed is:

1. A laminated core punching apparatus, comprising:
an uncoiler for unwinding a strip-form steel plate for an iron core, which strip-form steel plate is wound into a coil shape and set on the uncoiler;
a rotor-punching press machine for punching out a rotor core piece from the strip-form steel plate and laminating the punched rotor core piece; and
a stator-punching press machine for punching out a stator core piece from the strip-form steel plate following punching of the rotor core piece and laminating the punched stator core piece, wherein
the rotor-punching press machine includes a molding die that performs partial punching gradually to approach a shape of the rotor core piece, a punching die for punching out the rotor core piece from the strip-form steel plate, and two rotor lamination stations for laminating the punched rotor core piece such that when a punching operation is underway in one of the rotor lamination stations, a punching operation in the other rotor lamination station is stopped, and in the rotor lamination station where punching is stopped, a rotational buildup operation for rotating a rotor laminated body, obtained by laminating the rotor core piece, by a predetermined angle in a circumferential direction of the rotor laminated body can be performed,
the stator-punching press machine includes a molding die that performs partial punching gradually to approach the shape of the stator core piece, a punching die for punching out the stator core piece from the strip-form steel plate, and two stator lamination stations for laminating the punched stator core piece such that when a punching operation is underway in one of the stator lamination stations, a punching operation in the other stator lamination station is stopped, and in the stator lamination station where punching is stopped, a rotational buildup operation for rotating a stator laminated body, obtained by laminating the stator core piece, by a predetermined angle in a circumferential direction of the stator laminated body can be performed,
the rotor-punching press machine and the stator-punching press machine are constructed to perform the punching operations synchronously, and
means for causing the strip-form steel plate to hang down in a loop, provided between the rotor-punching press machine and the stator-punching press machine for adjusting a length of the strip-form steel plate between the two press machines, and the means for causing the strip-form steel plate to hang down in a loop including means for guiding a loop locus of the strip-form steel plate from above so that the loop of the strip-form steel plate does not invert, the guiding means being disposed above the loop, the guiding means being capable of ascending and descending.

2. The laminated core punching apparatus according to claim 1, wherein each of the rotor-punching press machine and the stator-punching press machine performs the punching operations in accordance with a rotation of a respective crankshaft, and the crankshaft of the rotor-punching press machine and the crankshaft of the stator-punching press machine are connected so as to rotate integrally.

3. The laminated core punching apparatus according to claim 1, wherein an outer diameter of the stator core piece is within a range of 200 mm to 300 mm.

4. The laminated core punching apparatus according to claim 1, wherein the rotor core piece and the stator core piece are automobile pieces used in a motor for driving an automobile.

5. A laminated core punching apparatus, comprising:
an uncoiler for unwinding a strip-form steel plate for an iron core, which strip-form steel plate is wound into a coil shape and set on the uncoiler;
a rotor-punching press machine for punching out a rotor core piece from the strip-form steel plate and laminating the punched rotor core piece; and
a stator-punching press machine for punching out a stator core piece from the strip-form steel plate following punching of the rotor core piece and laminating the punched stator core piece, wherein
the rotor-punching press machine includes a molding die that performs partial punching gradually to approach a shape of the rotor core piece, a punching die for punching out the rotor core piece from the strip-form steel plate, and two rotor lamination stations for laminating the punched rotor core piece such that when a punching operation is underway in one of the rotor lamination stations, a punching operation in the other rotor lamination station is stopped, and in the rotor lamination station where punching is stopped, a rotational buildup operation for rotating a rotor laminated body, obtained by laminating the rotor core piece, by a predetermined angle in a circumferential direction of the rotor laminated body can be performed,
the stator-punching press machine includes a molding die that performs partial punching gradually to approach the shape of the stator core piece, a punching die for punching out the stator core piece from the strip-form steel plate, and two stator lamination stations for laminating the punched stator core piece such that when a punching operation is underway in one of the stator lamination stations, a punching operation in the other stator lamination station is stopped, and in the stator lamination station where punching is stopped, a rotational buildup operation for rotating a stator laminated body, obtained by laminating the stator core piece, by a predetermined angle in a circumferential direction of the stator laminated body can be performed,
the rotor-punching press machine and the stator-punching press machine are constructed to perform the punching operations synchronously, and
an intermediate loop portion capable of causing the strip-form steel plate to hang down in a loop is provided between the rotor-punching press machine and the stator-punching press machine in order to adjust a length of the strip-form steel plate between the two press machines, and a loop guide portion that guides a loop locus of the strip-form steel plate from above so that the loop of the strip-form steel plate does not invert is disposed above the loop to be capable of ascending and descending;
wherein each of the rotor-punching press machine and the stator-punching press machine performs the punching operations in accordance with a rotation of a respective crankshaft, and the crankshaft of the rotor-punching press machine and the crankshaft of the stator-punching press machine are connected so as to rotate integrally.

6. The laminated core punching apparatus according to claim 5, wherein an outer diameter of the stator core piece is within a range of 200 mm to 300 mm.

7. The laminated core punching apparatus according to claim 5, wherein the rotor core piece and the stator core piece are automobile pieces used in a motor for driving an automobile.

* * * * *